United States Patent
Ye et al.

(10) Patent No.: US 9,918,585 B2
(45) Date of Patent: Mar. 20, 2018

(54) FILTERING APPARATUS FOR FILTERING A BEVERAGE IN A BEVERAGE PRODUCING APPARATUS

(71) Applicants: Yangsheng Ye, Putuo District (CN); Yusheng Shi, Putuo District (CN)

(72) Inventors: Yangsheng Ye, Putuo District (CN); Yusheng Shi, Putuo District (CN)

(73) Assignee: TEATEK CO., LTD., Shanghai (CN)

( * ) Notice: Subject to any disclaimer, the term of this patent is extended or adjusted under 35 U.S.C. 154(b) by 141 days.

(21) Appl. No.: 14/697,087

(22) Filed: Apr. 27, 2015

(65) Prior Publication Data
US 2015/0230654 A1    Aug. 20, 2015

Related U.S. Application Data

(63) Continuation of application No. 13/698,715, filed as application No. PCT/CN2011/074344 on May 19, 2011, now abandoned.

(30) Foreign Application Priority Data

May 20, 2010  (CN) .......................... 2010 1 0179507
May 20, 2010  (CN) .......................... 2010 1 0179518

(Continued)

(51) Int. Cl.
A47J 31/06       (2006.01)
A47J 31/40       (2006.01)

(52) U.S. Cl.
CPC ............. *A47J 31/407* (2013.01); *A47J 31/06* (2013.01)

(58) Field of Classification Search
CPC .... A47J 31/06; A47J 31/0642; A47J 31/0657; A47J 31/0668; A47J 31/0673;
(Continued)

(56) References Cited

U.S. PATENT DOCUMENTS

| 4,867,993 A | 9/1989 | Nordskog |
| 5,393,548 A | 2/1995 | Heiligman |

(Continued)

FOREIGN PATENT DOCUMENTS

| CA | 2842533 A1 * | 2/2013 | .......... A47J 31/3628 |
| CN | 2233911 Y | 8/1996 | |

(Continued)

OTHER PUBLICATIONS

Dictionary.com Definition of Cylinder, accessed on Oct. 24, 2016, http://www.dictionary.com/browse/cylinder.*

(Continued)

*Primary Examiner* — Dana Ross
*Assistant Examiner* — Brandon Harvey
(74) *Attorney, Agent, or Firm* — Im IP Law; C. Andrew Im

(57) ABSTRACT

A filtering apparatus for filtering a beverage in a beverage producing apparatus, includes a base plate, a plurality of piercing components connected to a front side of the base plate, and a plurality of filtering holes extending through the base plate from the front side of the base plate to the rear side of the base plate. Each piercing component includes a piercing base extending away from the front side of the base plate, and a piercing point, integrated with the piercing base, having a pointed tip. During use of the beverage producing apparatus, the filtering apparatus mates with a sealing cover of a beverage cartridge by coupling the plurality of filtering holes and the plurality of piercing components with the sealing cover to form a filtering screen.

18 Claims, 13 Drawing Sheets

(30) Foreign Application Priority Data

| May 21, 2010 | (CN) | .......................... 2010 1 0181098 |
| May 21, 2010 | (CN) | .................... 2010 2 0201394 U |
| May 21, 2010 | (CN) | .................... 2010 2 0201426 U |

(58) Field of Classification Search
CPC ............... A47J 31/0678; A47J 31/3623; A47J 31/3628; A47J 31/369; A47J 31/3695; A47J 31/407; A47J 31/44; A47J 31/4403; A47J 31/446

See application file for complete search history.

(56) References Cited

U.S. PATENT DOCUMENTS

| 5,927,179 | A | 7/1999 | Mordini et al. | |
| 5,974,950 | A | 11/1999 | King | |
| 6,025,000 | A | 2/2000 | Fond et al. | |
| 6,026,732 | A * | 2/2000 | Kollep | A47J 31/0668 99/295 |
| 6,517,880 | B2 | 2/2003 | Walters, Jr. et al. | |
| 6,645,537 | B2 | 11/2003 | Sweeney et al. | |
| 6,849,285 | B2 | 2/2005 | Masek et al. | |
| 2002/0048621 | A1 | 4/2002 | Boyd et al. | |
| 2003/0070554 | A1* | 4/2003 | Cortese | A47J 31/3628 99/279 |
| 2004/0180123 | A1* | 9/2004 | Halliday | A47J 31/4407 426/397 |
| 2004/0197444 | A1 | 10/2004 | Halliday et al. | |
| 2005/0150391 | A1 | 7/2005 | Schifferle | |
| 2006/0174769 | A1* | 8/2006 | Favre | A47J 31/0668 99/275 |
| 2007/0144357 | A1 | 6/2007 | Rivera | |
| 2007/0203587 | A1 | 8/2007 | Erlandsson et al. | |
| 2008/0148948 | A1 | 6/2008 | Evers et al. | |
| 2009/0155422 | A1 | 6/2009 | Ozanne | |
| 2009/0183640 | A1 | 7/2009 | Ozanne | |
| 2009/0205747 | A1 | 8/2009 | Lillard, Jr. | |
| 2010/0064899 | A1 | 3/2010 | Aardenburg | |
| 2010/0078480 | A1 | 4/2010 | Aker | |
| 2010/0166928 | A1 | 7/2010 | Stamm et al. | |
| 2010/0282088 | A1 | 11/2010 | Deuber et al. | |
| 2011/0041700 | A1 | 2/2011 | Epars et al. | |
| 2013/0014648 | A1 | 1/2013 | Rognon et al. | |
| 2013/0064929 | A1 | 3/2013 | Jarisch et al. | |
| 2013/0129872 | A1 | 5/2013 | Kruger | |
| 2013/0206011 | A1 | 8/2013 | Ozanne et al. | |
| 2013/0312619 | A1 | 11/2013 | Spiegel et al. | |
| 2014/0134299 | A1 | 5/2014 | Guidorzi et al. | |
| 2014/0224130 | A1 | 8/2014 | Castellani et al. | |

FOREIGN PATENT DOCUMENTS

| CN | 1408309 A | 4/2003 | |
| CN | 2671985 Y | 1/2005 | |
| CN | 1593310 A | 3/2005 | |
| CN | 1897853 A | 1/2007 | |
| CN | 101534685 A | 9/2009 | |
| CN | 101588974 A | 11/2009 | |
| CN | 101636333 A | 1/2010 | |
| CN | 201375420 Y | 1/2010 | |
| CN | 100591253 C | 2/2010 | |
| CN | 201418620 Y | 3/2010 | |
| CN | 101828840 A | 9/2010 | |
| CN | 101849768 A | 10/2010 | |
| CN | 101849774 A | 10/2010 | |
| CN | 101862119 A | 10/2010 | |
| CN | 201691687 U | 1/2011 | |
| CN | 201691689 U | 1/2011 | |
| CN | 201691699 U | 1/2011 | |
| EP | 1364605 A1 * | 11/2003 | .......... A47J 31/3628 |
| EP | 1440640 A2 | 7/2004 | |
| EP | 1890271 A1 | 2/2008 | |
| JP | 2003-012016 A | 1/2003 | |
| JP | 2005-270481 A | 10/2005 | |

OTHER PUBLICATIONS

Int'l Search Report dated Sep. 1, 2011 in Int'l Application No. PCT/CN2011/074353.

Int'l Search Report dated Aug. 25, 2011 in Int'l Application No. PCT/CN2011/074330.

Int'l Search Report dated Sep. 1, 2011 in Int'l Application No. PCT/CN2011/074344.

Office Action dated Sep. 11, 2014 in Chinese Application No. 201180029672.X.

* cited by examiner

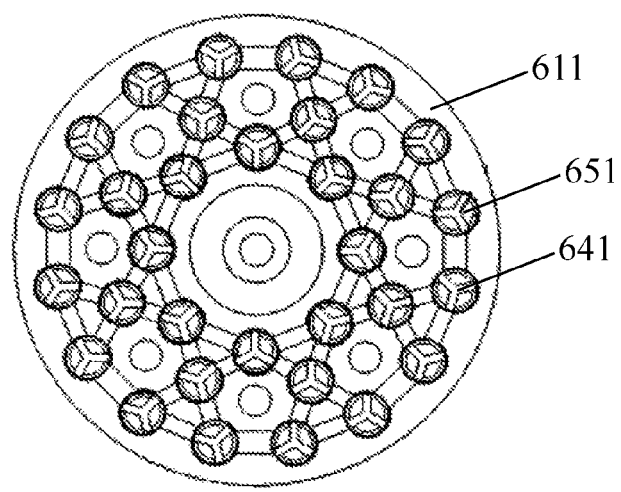
FIG. 19
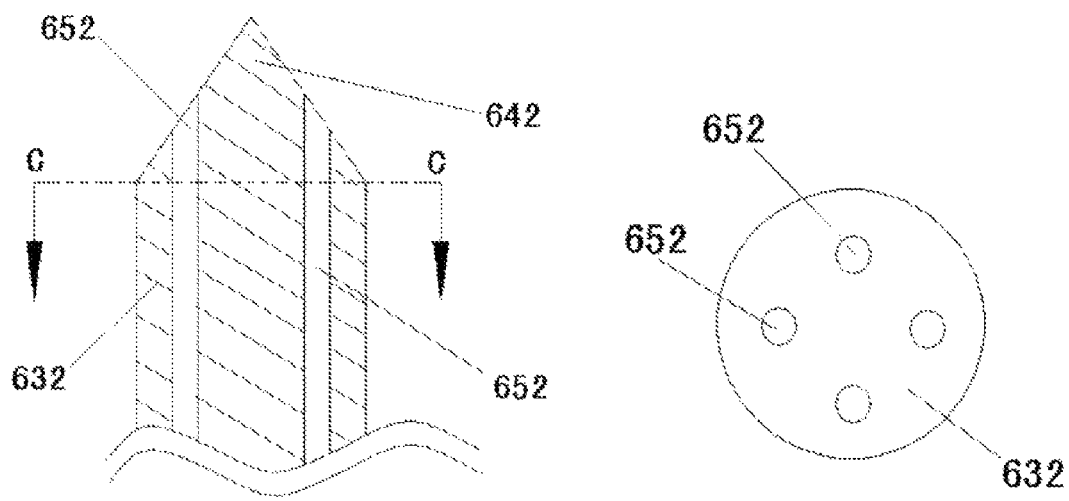
FIG. 20
FIG. 21

FILTERING APPARATUS FOR FILTERING A BEVERAGE IN A BEVERAGE PRODUCING APPARATUS

CROSS-REFERENCE TO RELATED APPLICATION

This application is a continuation of U.S. patent application Ser. No. 13/698,715 filed Nov. 19, 2012, which, in turn, is a Section 371 of International Application No. PCT/CN2011/074344, filed May 19, 2011, which was published in the Chinese language on Nov. 24, 2011, under International Publication No. WO 2011/144044 A1. The disclosures of each of the above-identified applications are incorporated herein by reference.

BACKGROUND OF THE INVENTION

Field of the Invention

The invention relates to a beverage producing field, specially a kind of beverage substance cartridge, an identifying apparatus, a beverage producing equipment, a beverage producing system and a beverage producing method.

Related Background Art

Drinking tea and tasting tea is a long-lasting tradition in China. People drinking tea frequently can not only cultivate their taste, but also prolong their life. Especially there are over 100 tea leaf varieties in China. Every variety has its unique characteristics, and different brewing methods are utilized for different tea leaf varieties to extract different advantages during brewing. For example, there are different requirements for water temperatures and brewing time.

Meanwhile, the traditional way of drinking tea is to put tea leaves directly into a tea pot which is then filled with hot water for brewing and drinking, but this is inconvenient because all the process is handled and controlled manually. This may not be a problem for people with spare time or professional tea tasters, but it is too time-consuming for people at offices who want to drink tea.

In order to realize automatic tea brewing, a very simple automatic tea brewing equipment with a single function was designed (for example, please refer to Chinese patent application number 200410041385.2). This invention has a cup-shaped filtering screen used to filter tea leaf, but the cup-shaped filtering screen has relatively large meshes which could only filter some comparatively large tea leaves, so small and fine tea leaf powder is mixed into tea water.

No matter the process, manual tea making or an automatic tea brewing equipment, brewed tea water is always mixed with tea leaves. That is, tea drinkers always end up eating some tea leaf powder while drinking their tea. The tea leaf powder in a tea brewing equipment or a tea set has to be cleared away afterwards, and the whole process is troublesome for many.

SUMMARY OF THE INVENTION

It is, therefore, an object of the invention to provide a beverage substance cartridge, a filtering apparatus, a beverage producing equipment, a beverage producing system and a beverage producing method to solve the troublesome problem of the present technology that the tea drinkers end up eating tea leaf powder while drinking tea brewed from a tea brewing equipment and have to clean the tea leaf powder in the equipment afterwards.

In order to realize the abovementioned objects, the claimed invention has adopted the following technical plan:

There is provided a beverage substance cartridge comprising a cartridge body which accommodates substance for beverage production and a sealing cover to seal the substance in the cartridge body. The sealing cover includes at least two layers of sealing film made of different material.

The sealing cover consists three layers of the sealing film. The three layers of sealing film are an inner layer of sealing film, a middle layer of sealing film and an outer layer of sealing film, which are in sequence from inside of cartridge body to outside. The inner layer of sealing film is made of polypropylene material, the middle layer of sealing film is made of aluminum foil material, and the outer layer of sealing film is made of polyethylene terephthalate material.

The substance is any one of or a combination of at least two of tea leaf, dried vegetable, dried fruit and Chinese medicinal herb.

There is provided a filtering apparatus which provides a filtering function for the beverage substance cartridge comprising a base plate corresponding to the shape of the beverage substance cartridge. On the front surface of base plate, plural piercing components set evenly, which can pierce the sealing cover of the beverage substance cartridge. The piercing component includes a piercing base which sets on the base plate and a piercing point which is integrally formed with the piercing base, and the base plate is set with plural filtering holes.

The front surface of the base plate is a convex arc surface.

The piercing point is a multi-edge pyramid, the piercing base is a multi-edge cylinder, and the plural filtering holes run through piercing points, the piercing base and the base plate.

The piercing point is a multi-edge pyramid, the piercing base is a cylinder, and the plural filtering holes run through the piercing points, the piercing base and the base plate.

The piercing point is a cone, the piercing base is a cylinder, and the plural filtering holes run through the piercing points, the piercing base and the base plate.

The piercing point is a polygonal pyramid, the piercing base is a polygonal cylinder, and the plural filtering holes run through the base plate.

The piercing point is a polygonal pyramid, the piercing base is a cylinder, and the plural filtering holes run through the piercing base and the base plate.

The piercing point is a polygonal pyramid, the piercing base is a multi-edge cylinder, and the plural filtering holes run through the piercing base and the base plate.

The piercing point is of triangular pyramid structure, the piercing base is a triangular prismoid, the filtering hole is set between two adjacent edges on the base plate, and three filtering holes are set at the root of every piercing point.

Further, the material of the filtering apparatus is aluminum or polypropylene plastic.

There is provided a beverage producing equipment which uses the beverage substance cartridge for beverage production comprising:

a beverage substance cartridge putting section to put the beverage substance cartridge;

a water supplying section which supply water for beverage production;

a brewing apparatus to brews the substance into beverage;

a filtering apparatus which filters beverage brewed from the brewing apparatus; and a water exporting section which exports beverage filtered from the filtering apparatus.

The filtering apparatus is the filtering apparatus as described hereinabove.

The filtering apparatus also includes a funnel buckled on the back surface of the base plate. The funnel is sealed and connected with the base plate. The water outlet of the funnel is connected with the water exporting section.

The beverage producing equipment further comprises a transmitting apparatus to make the sealing film of the beverage substance cartridge pierced by the filtering apparatus and make the central axis of the beverage substance cartridge consistent with the central axis of the base plate.

The included angle between the central axis of the base plate of the filtering apparatus and horizontal is a 60° angle.

The brewing apparatus has a heating section which heats the water supplied by a water supplying section, a water-filling section which fills the heated water to the beverage substance cartridge and a steeping section which steeps the substance.

The beverage producing equipment further comprises a controlling section which sends a controlling command to the beverage substance cartridge putting section, the water supplying section, the brewing apparatus, the transmitting apparatus, the filtering apparatus and the water exporting section.

There is provided a beverage producing system comprising the beverage producing equipment and the beverage substance cartridge as described hereinabove.

There is provided a beverage producing method using the beverage producing system described above for beverage production comprising the following steps:

1) the beverage substance cartridge is placed in the beverage substance cartridge putting section;

2) the transmitting apparatus moves the beverage substance cartridge putting section slantwise and pushes towards the filtering apparatus;

3) the piercing points on the filtering apparatus pierce the sealing cover of the beverage substance cartridge;

4) the water filling section fills water to the beverage substance cartridge and brews the substance in the beverage substance cartridge;

5) the filtering apparatus filters brewed beverage out through the filtering screen during brewing;

6) the tea water filtered from the filtering holes is transported to the water exporting section through the funnel; and 7) the water exporting section is exports the filtered beverage.

Due to the technical features above, compared with the present technology, the claimed invention has the following advantages and positive effects:

The claimed invention provides the beverage substance cartridge, the tea filtering apparatus, the beverage producing equipment, the beverage producing system and the beverage producing method to efficiently filter tea leaf and eliminate the need to clear and clean the used tea leaf manually. The beverage substance cartridge is used in conjunction with the tea filtering apparatus. The piercing point of the triangular pyramid structure can pierce the sealing cover of the beverage substance cartridge and then forms matrix-shaped filtering holes in the sealing cover. The brewed tea water flows out of the filtering holes and used tea leaf is left in the extracting cartridge, thereby providing a simple and convenient filtering process without requiring the manual cleanup of tea leaf.

BRIEF DESCRIPTION OF THE DRAWINGS

FIG. 19 is a front elevated view of a tea filtering apparatus with a modification to embodiment 1.

FIG. 20 is a longitudinal sectional view of the piercing component in modification 2 of embodiment 1;

FIG. 21 is a cross-sectional view taken along line C-C in FIG. 20; and

DETAILED DESCRIPTION OF THE PREFERRED EMBODIMENTS

Preferred embodiments of a beverage substance cartridge, a filtering apparatus, a beverage producing equipment, a beverage producing system and a beverage producing method of the claimed invention will be described in detail hereinbelow with reference to the drawings. However, the claimed invention is not only limited to these embodiments. Specific details are given in the following preferred embodiments of the invention to give the public a thorough understanding about the invention.

Embodiment 1

Figure 1:
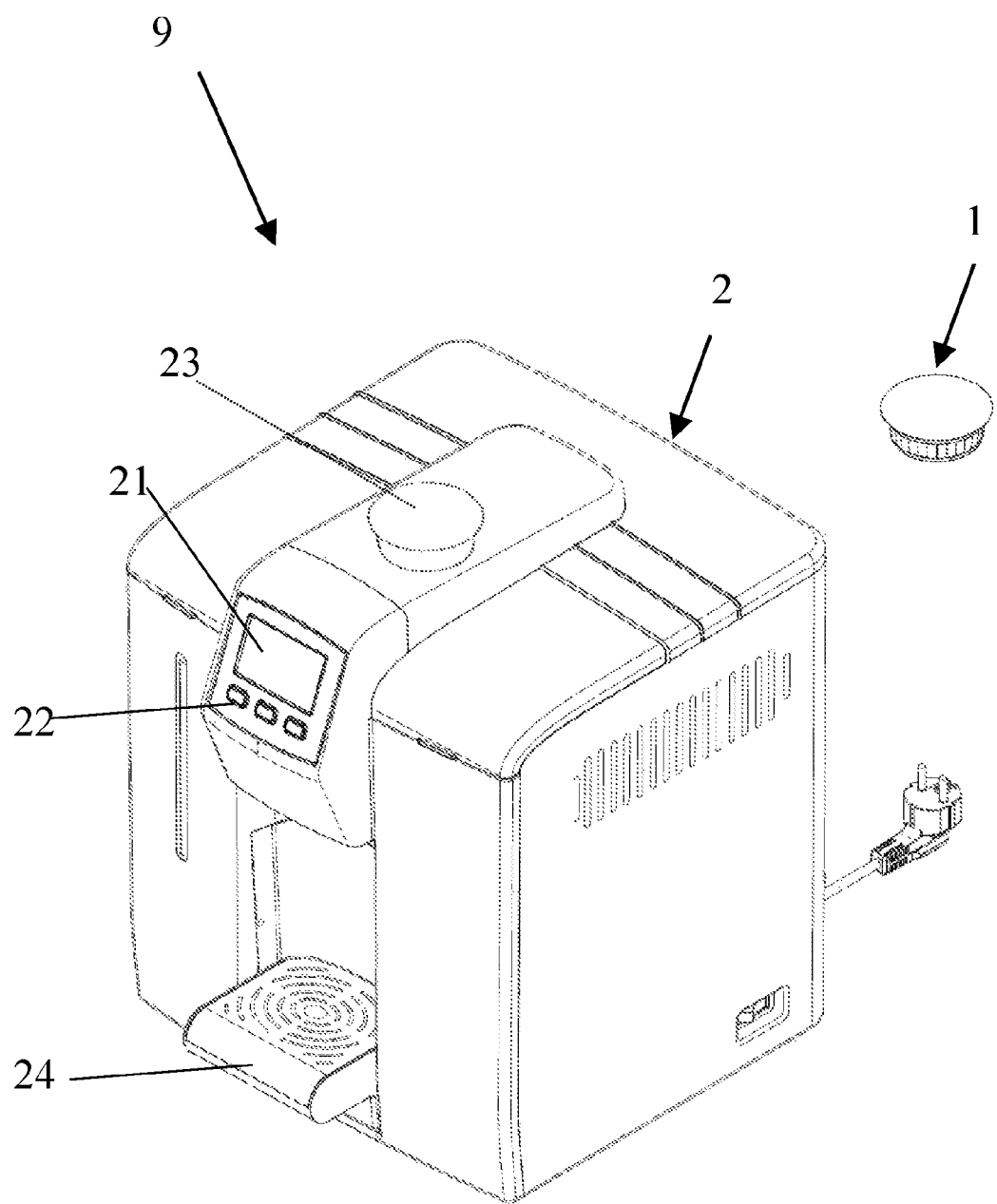
FIG. 1 is a structural illustration of a beverage producing system in an embodiment of the invention.

As shown by FIG. 1, the producing equipment system 9 includes the beverage substance cartridge 1 and the beverage producing equipment 2 for use in collaboration.

The beverage producing equipment 2 has a cavity 23 which corresponds to the beverage substance cartridge 1 in size and shape. The beverage substance cartridge 1 is placed in the cavity 23. The beverage producing equipment 2 has a supporting platform 24, which is a detached horizontal platform for placing the cup.

One set of beverage producing equipment 2 may be used in collaboration with different beverage substance cartridges 1. A user only needs to select a beverage substance cartridge 1, place the selected beverage substance cartridge 1 into the cavity 23 of the beverage producing equipment 2 and operate the beverage producing equipment 2 according to prompts on a display screen 21 to obtain the brewed beverage in a minute.

Figure 2:
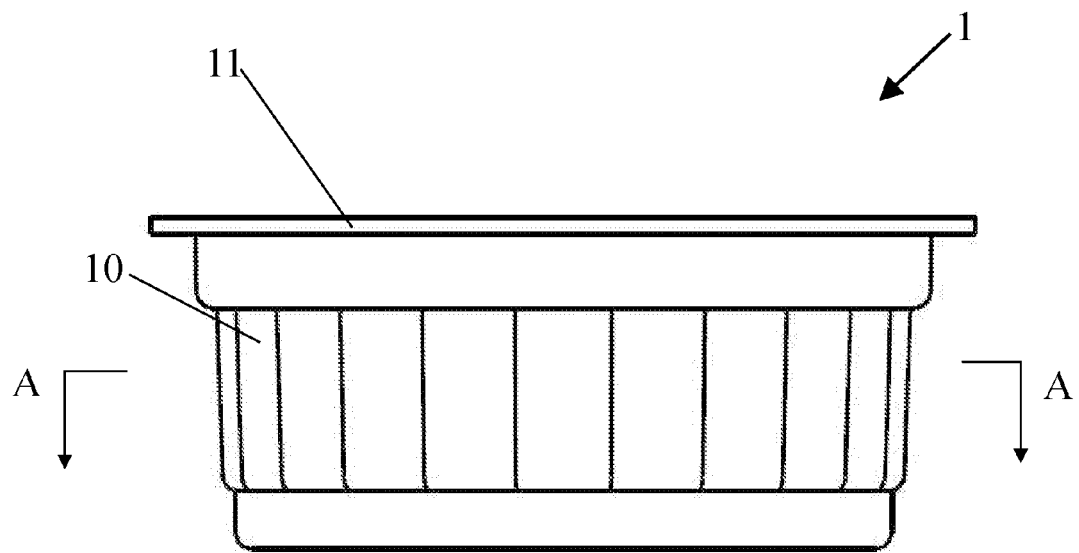
FIG. 2 is a structural illustration of the beverage substance cartridge in the embodiment of the invention.
Figure 3:
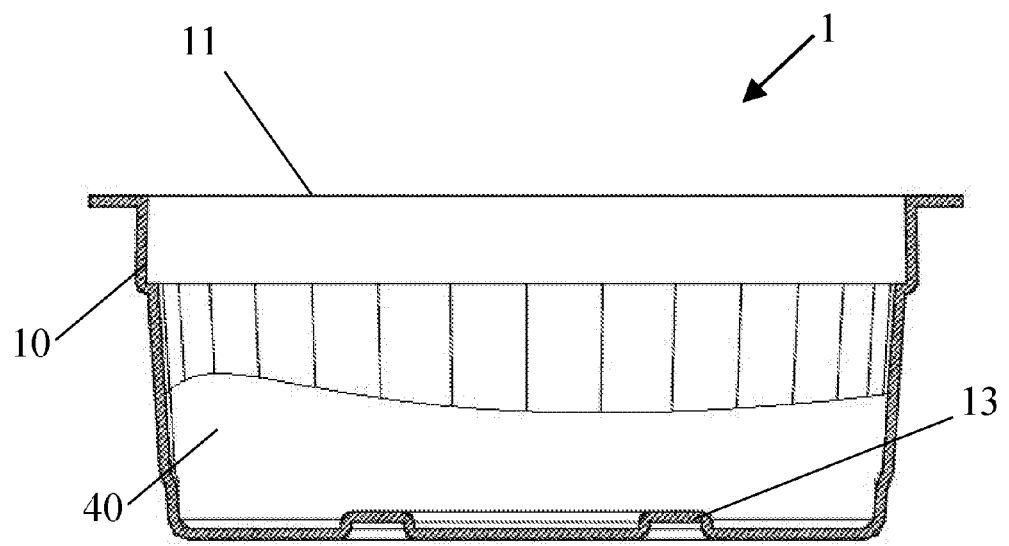
FIG. 3 is a longitudinal sectional view of the beverage substance cartridge in the embodiment of the invention.

As shown in FIGS. 2-3, the beverage substance cartridge 1 includes a cartridge body 10 and a sealing cover 11.

The cartridge body 10 accommodates the substance 40 for beverage production.

The sealing cover 11 seals the substance 40 in the cartridge body 10.

Figure 5:
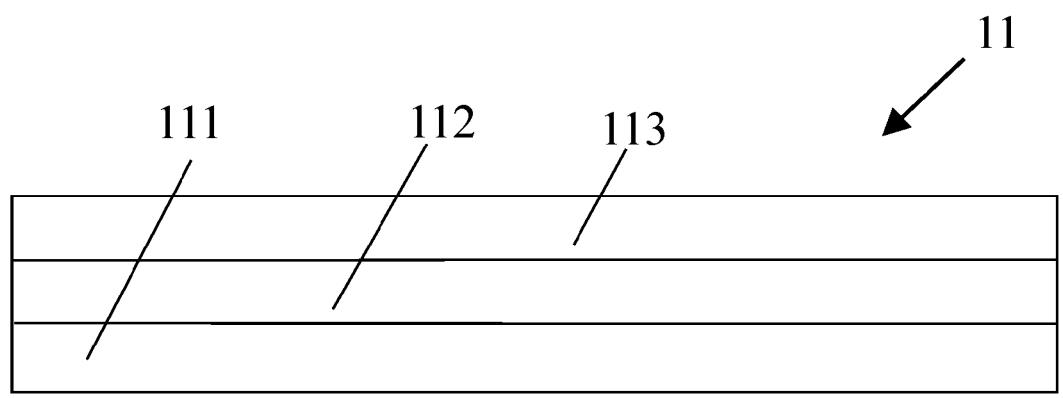
FIG. 5 is a structural illustration of sealing film of the beverage substance cartridge in the embodiment of the invention.
Figure 6:
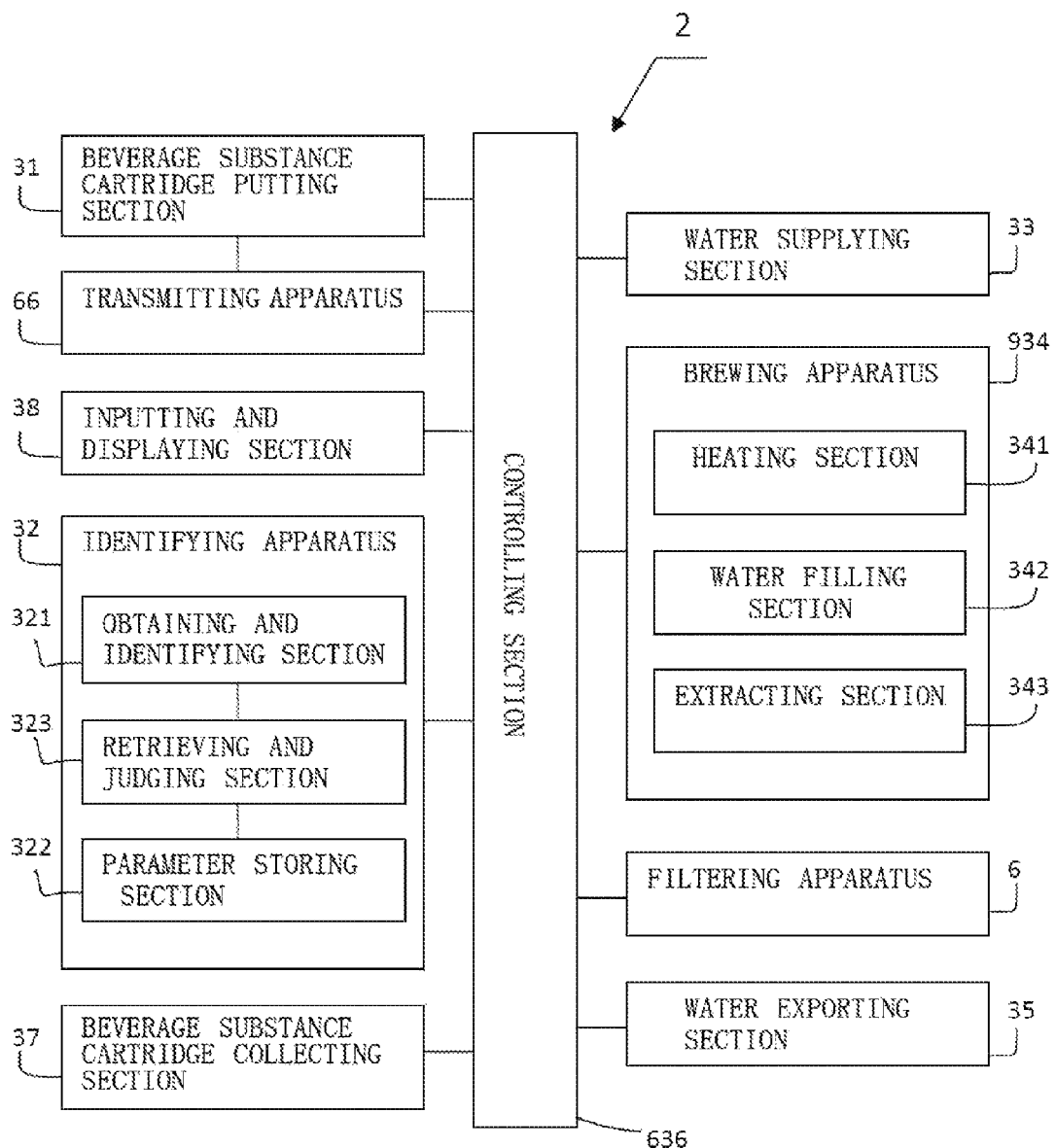
FIG. 6 is a structural diagram of the beverage producing system in the embodiment of the invention.

As shown in FIG. 5, the sealing cover 11 includes at least two layers of sealing film made of different substances, a multi-layer co-extrusion sealing film. In the preferred embodiment, the sealing cover 11 is comprised of three layers of sealing film, namely an inner layer of sealing film 111, a middle layer of sealing film 112 and an outer layer of sealing film 113 from the inside out of the cartridge body in sequence. The inner layer of sealing film 111 is made of polypropylene substance, the same substance as the cartridge body. The hot-melt technology is used to seal the cartridge body 10 rapidly after the cartridge body 10 is filled with the beverage substance. The middle layer of sealing film 112 is made of aluminum foil substance to ensure that the sealing cover has certain strengthen and durability against breakage. The outer layer of sealing film 113 is made of polyethylene terephthalate substance to make the sealing cover more aesthetically pleasing. An identification label used to identify beverage is directly printed on the outer layer of sealing film 113. The sealing cover 11 has certain flexibility and undergoes micro-deformation to improve the sealing effects after being pierced.

Figure 4:
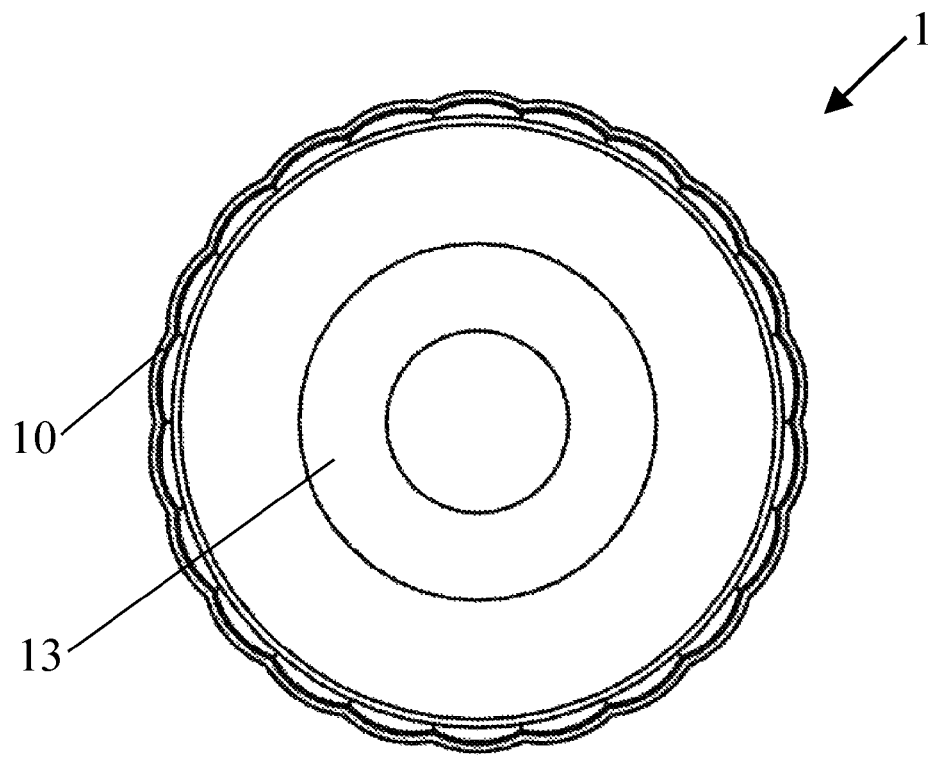
FIG. 4 is an A-A sectional view of FIG. 2.

As shown in FIG. 4, the side wall of the cartridge body 10 comprises a plurality of arc sections. An internal convex edge is formed where two adjacent arc sections are jointed, hence the side wall has many rolling edges. Water forms a vortex when it contacts the edge of the cartridge body 10, thereby promoting greater contact between water and tea leaf, and improving extraction efficiency.

The cartridge body 10 can be pierced by a needle-shaped piercing point of a water-filling apparatus. The cartridge body 10 bears pressure formed on the side wall of the cartridge body 10 when the vortex is generated within the cartridge body 10. Convex or sunk circular rings are at the bottom of the cartridge body 10 to strengthen the cartridge body 10 to better bear the pressure formed at the bottom of the cartridge body 10 when the vortex is generated within the cartridge body 10.

In an embodiment, the diameter of the bottom surface of the cartridge body 10 is 38 mm, the diameter of the sealing cover 11 is 50 mm, the inner diameter of the circular ring at the bottom of the cartridge body 10 is 12 mm, and the outer circle's diameter is 20 mm. The circular ring 13 at the bottom of the cartridge body 10 is raised upwards. The distance between two adjacent edges is 5 mm, and the arched convex between two adjacent edges is 1.2 mm thick.

As shown in FIG. 5, the beverage producing equipment 2 includes a beverage substance cartridge putting section 31, a conveying apparatus 66, an inputting and displaying section 38, an identifying apparatus 32, a water supplying section 33, a brewing apparatus 34, a filtering apparatus 6, a water exporting section 35, a controlling section 636 and a beverage substance cartridge collecting section 37.

As shown in FIG. 1, the beverage substance cartridge putting section 31 includes the cavity 23 for placing the beverage substance cartridge 1. The cavity 23 corresponds to the beverage substance cartridge 1 in size and shape.

The conveying apparatus 66 (see FIGS. 7 and 8 for details) is located under the beverage substance cartridge putting section 31, and the conveying apparatus 66 moves or slides the beverage substance cartridge putting section 31 slantways.

The inputting and displaying section 38 displays the working information of the beverage producing equipment 2 and information of the beverage substance 40. Control commands can be inputted using the inputting and display section 38. The inputting and displaying section 38 includes the display screen 21 and keyboards 22.

The display screen 21 displays working status of the beverage producing equipment 2 and relevant information about the various beverage substances 40 (such as tea leaf).

The keyboard 22 is set with corresponding keys to selectively control the operation of the beverage producing equipment 2, for example, consulting relevant beverage information or choosing to output commands.

The identifying apparatus 32 is used to identify the substance 40 in the beverage substance cartridge 1. The identifying apparatus 32 has an obtaining and identifying section 321, a parameter storing section 322 and a retrieving and judging section 323.

The obtaining and identifying section 321 reads the identification label 14 in the beverage substance cartridge and identifies identification codes corresponding to the identification label 14.

The pattern identification unit to read the identification label 14 is an image pick-up device, such as a camera. The obtaining and identifying section 321 translates the identification label 14 into an identification code readable for the equipment.

A cache (not shown in the figure) is set inside of the obtaining and identifying section 321 to save the identification code A2 for a comparison with the next identification code.

The parameter storing section 322 stores the brewing parameters.

The retrieving and judging section 323 retrieves the brewing parameters from the parameter storing section 322 according to the identification label 14 read by the obtaining and identifying section 321. The retrieving and judging section determines the brewing parameter corresponding to the identification label 14.

The water supplying section 33 supplies the water for beverage production. The water supplying section 33 includes a water tank and a water pump. The water tank stores clear water, and the water pump controls the water supplying speed which is generally represented by the break-make ratio of the water pump.

The brewing apparatus 34 brews the substance 40 according to the brewing parameters determined by the retrieving and judging section 323, and provides the brewed beverage. The brewing apparatus 34 has a heating section 341, a water-filling section 342 and a steeping section 343.

The heating section 341 heats the water supplied by the water supplying section 33. The heating section 341 has a temperature sensor connected to the controlling section 636. The temperature sensor detects the temperature of the water in the heating section 341 in a real-time and displays the temperature data in the display screen 21 through the controlling section 636 so the users can learn about Teaism in the beverage brewing process.

The water filling section 342 fills the heated water into the beverage substance cartridge 1.

The steeping section 343 steeps the substance 40. The substance in the embodiment is tea leaves. There are three kinds of the steeping of the tea leaves, namely, tea waking, presoaking and extracting in sequence.

The filtering apparatus 6 (see FIGS. 9-11 for details) filters the beverage brewed from the brewing apparatus. The filtering apparatus 6 includes a base plate 61 with the shape corresponding to the beverage substance cartridge 1 and a plurality of piercing components 62 evenly set on the front side of the base plate 61. The base plate 61 includes a front side 61a, a reverse side 61b, and an outer rim 61c. The piercing components 62 pierce the sealing cover 11 of the beverage substance cartridge 1. The piercing component 62 includes a piercing base 63 set on the base plate and the piercing point 64 is integrated with the piercing base 63 (see FIG. 12 for details). Each piercing base 63 includes an outward face 63a, an inner face 63b, a bottom edge 63c, and an upper edge 63d, as particularly shown in FIGS. 12 and 13. Multiple filtering holes 65 are set on the base plate 61 and the piercing point 64 is a polygonal pyramid structure. Each piercing point 64 includes a plurality of angled faces 64a and a pointed tip 64b. As shown particularly in FIG. 13, each filtering hole 65 has inner edges 65a at the front side 61a of the base plate 61, with each inner edge 65a corresponding to a bottom edge 63c of the piercing base. Each filtering hole 65 also includes an outer edge 65b.

Figure 7:
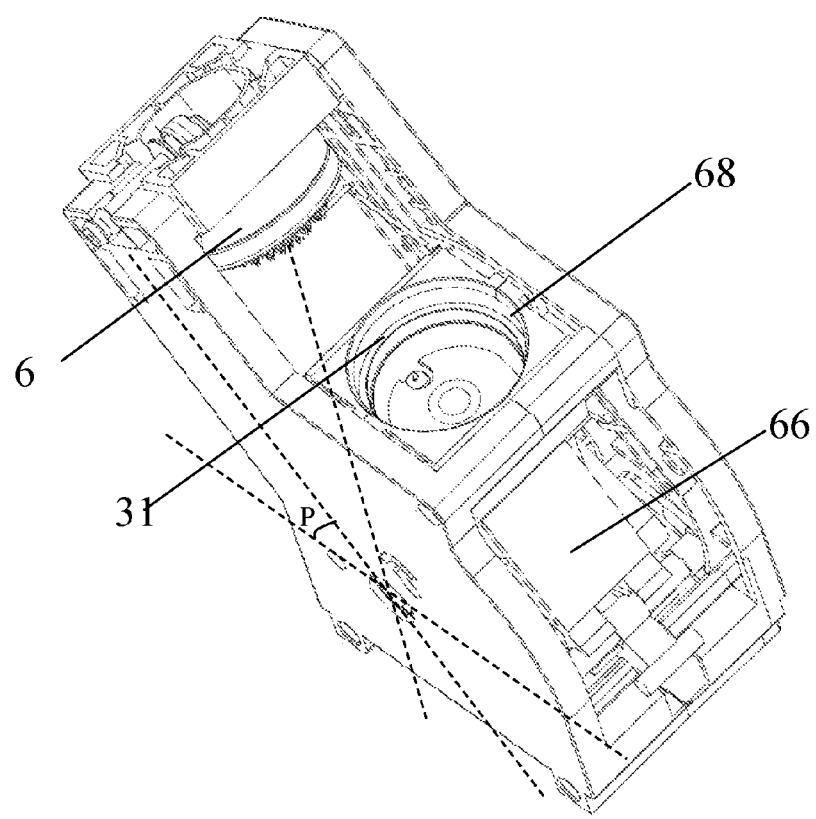
FIG. 7 is a structural illustration of an initial state of a transmitting apparatus in the embodiment of the invention.
Figure 8:
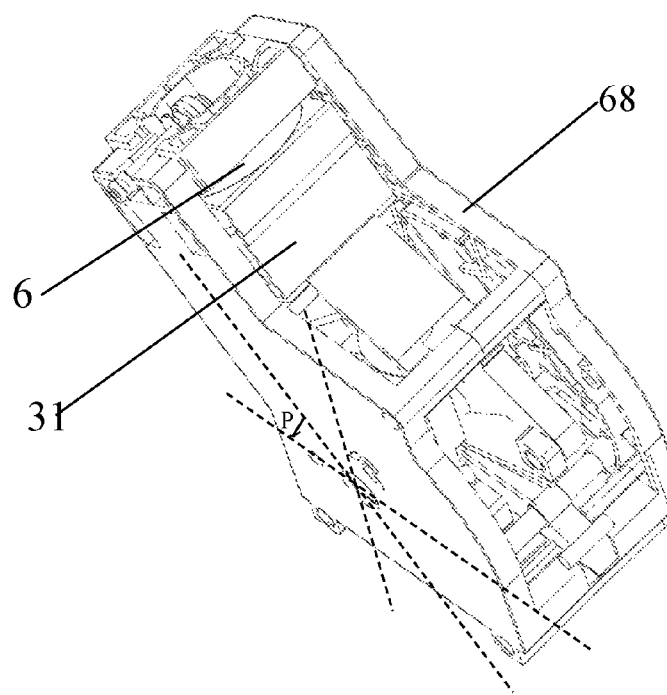
FIG. 8 is a structural illustration of a working state of the transmitting apparatus in the embodiment of the invention.

As shown in FIGS. 7-8, the beverage substance cartridge putting section 31 is fixed on the conveying apparatus 66. The position of the beverage substance cartridge putting section 31 is at the top of the beverage producing equipment 2 in an initial state. A covering plate which could be uncovered is right above the beverage substance cartridge putting section 31 for users to place the beverage substance cartridge 1. The beverage substance cartridge 1 is closely adjacent to the filtering apparatus 6 and pierced by the piercing point 64 of the filtering apparatus 6. Moreover, the central axis of the beverage substance cartridge 1 is consistent with that of the base plate 61. The conveying apparatus 66 moves or slides the beverage substance cartridge putting section 31 slantways to shift the beverage substance cartridge putting section 31 between two positions.

The filtering apparatus 6 and the conveying apparatus 66 are mounted on a rack 68 inside of the beverage producing equipment 2. The filtering apparatus 6 is set on the top of the rack 68. The base plate 61 of the filtering apparatus 6 has a certain included angle with the level surface, which is generally a 0-60° angle. A 30° angle is selected in a certain embodiment, and the central axis of the base plate 61 of the filtering apparatus 6 has a 30° included angle with the level surface. The conveying apparatus 66 is set under the filtering apparatus 6. The upward moving route of the beverage substance cartridge putting section 31 in the rack 68 has a 30° included angle with the level surface. The angle P shown in FIGS. 7-8 is 30°.

Figure 9:
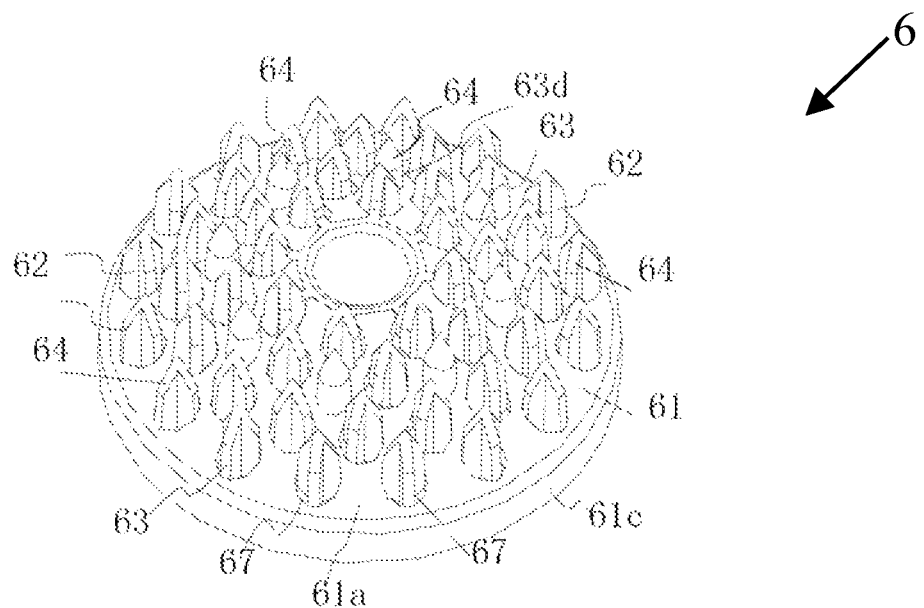
FIG. 9 is a front-side structural illustration of a tea filtering apparatus in the embodiment of the invention.
Figure 10:
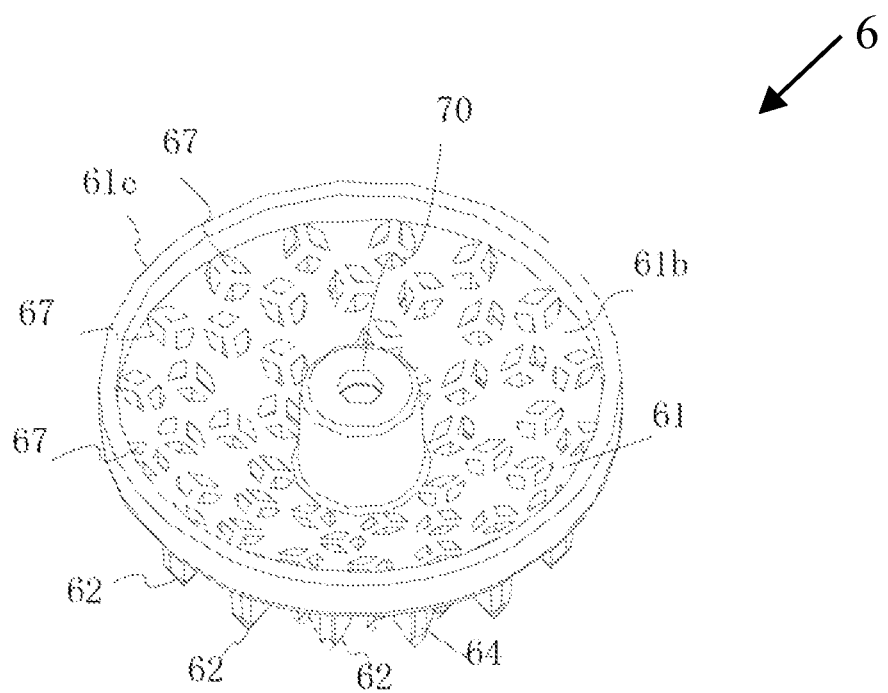
FIG. 10 is a reverse-side structural illustration of the tea filtering apparatus in the embodiment of the invention.
Figure 11:
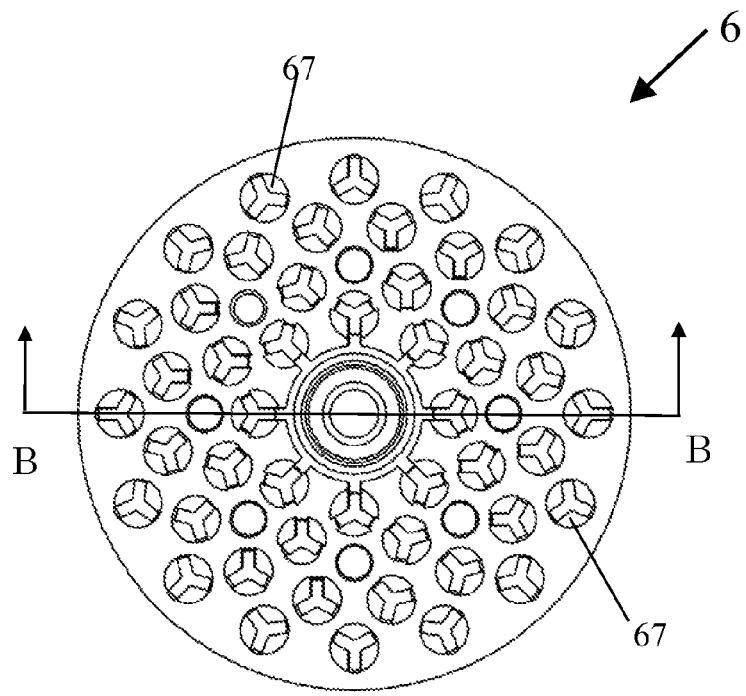
FIG. 11 is a front-side vertical view of the tea filtering apparatus in the embodiment of the invention.

As shown in FIGS. 9-11, the piercing point 64 is a polygonal pyramid. The piercing base 63 is a polygonal prism, a multi-edge cylinder or column. The filtering hole 65 is set between two adjacent edges on the base plate 61. In a certain embodiment, the piercing point 64 is a triangular pyramid, the piercing base 63 is a triangular prism, and three filtering holes 65 run through the base plate. In the embodiment, the filtering hole 65 is set between two adjacent edges of the base plate 61 and three filtering holes 65 are near every piercing component 62. These three filtering holes 65 and the piercing component 62 constitute a filtering hole group 67. In the present invention, possibly 24~60 filtering hole groups 67 are set on the base plate 61 (see FIGS. 11 and 13 for details). 48 groups are preferred in an embodiment. The sealing cover 11 and the filtering hole 65 form a filtering screen to filter the tea leaves. The diameter of the filtering hole 65 is small enough to keep the tea leaf powder into the beverage substance cartridge 1.

In an embodiment, the sealing cover 11 and the filtering hole 65 form a filtering screen. The unit time of the tea producing amount of the beverage producing equipment 2, i.e. the unit time of the tea water filtering amount of the filtering apparatus 6, is in proportion to the number of filtering holes 65, in proportion to the diameter of the filtering hole 65 or the cross-sectional area of the filtering hole 65, and in inverse proportion to the volume of the beverage substance cartridge 1. The unit time of the tea water producing amount of the beverage producing equipment 2 corresponds to the volume of the beverage substance cartridge 1, the number of the filtering holes 65, the diameter of the filtering hole 65 or the cross-sectional area of the filtering hole 65.

Figure 12:
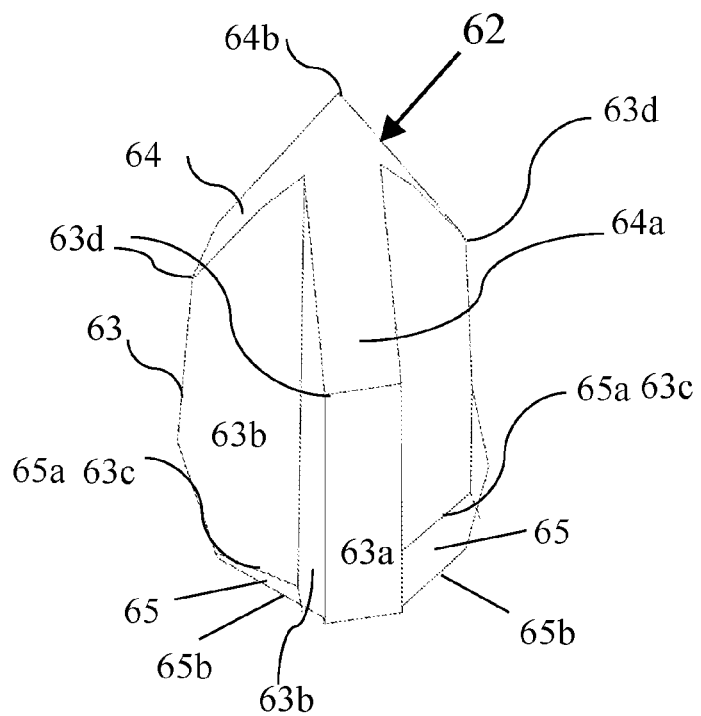
FIG. 12 is a structural illustration of a piercing component of the tea filtering apparatus in the embodiment of the invention.
Figure 13:
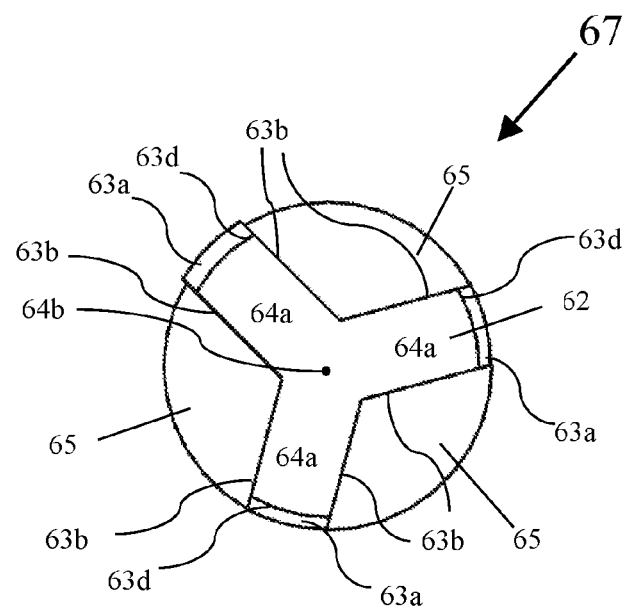
FIG. 13 is a structural illustration of a filtering hole m the invention.

As shown in FIG. 12, the piercing point 64 has diverse shapes. Only the keen-edge piercing part is necessary. The cross-sectional area of the piercing base 63 corresponding to the piercing point should be equal to or larger than the cross-sectional area of the piercing point 64. The filtering hole 65 has certain depth to penetrate the base plate 61, or penetrate the base plate 61 and the piercing base 63, and even penetrate the base plate 61, the piercing base 63 and the piercing point 64 at the same time.

Before use, the filtering apparatus 6 has a fixing hole 70 in the center, which inversely mounts the filtering apparatus 6 in the beverage producing equipment 2 through the fixing hole 70, and the piercing point 64 is downward after mounting.

The beverage producing equipment 2 also includes the conveying apparatus 66 to enable the sealing cover 11 of the beverage substance cartridge 1 to be pierced by the filtering apparatus 6. The central axis of the beverage substance cartridge 1 is consistent with the central axis of the base plate 61. The conveying apparatus 66 is a pure mechanical apparatus to push the beverage substance cartridge putting section 31 slantways to move and slide the beverage substance cartridge 1 into collision with the piercing point 64 of the filtering apparatus 6. The piercing point 64 pierces the sealing cover of the beverage substance cartridge 1. At least one filtering hole 65 is set near every piercing component 62.

In an embodiment, the front side of the base plate 61 is convex cambered surface. The included angle between the base plate 61 of the filtering apparatus 6 and the level surface is a 60° angle to make sure the piercing point 64 of the filtering apparatus 6 can pierce the sealing cover of the beverage substance cartridge rapidly and correctly into many small holes. After piercing the sealing cover 11 of the beverage substance cartridge, the piercing point 64 keeps the piercing state. The sealing cover 11 and the filtering holes 65 of the piercing point 64 form a filtering screen. The sealing cover 11 has certain flexibility, and undergoes micro deformation after being pierced to improve the sealing effects near the piercing point 64.

Figure 22:
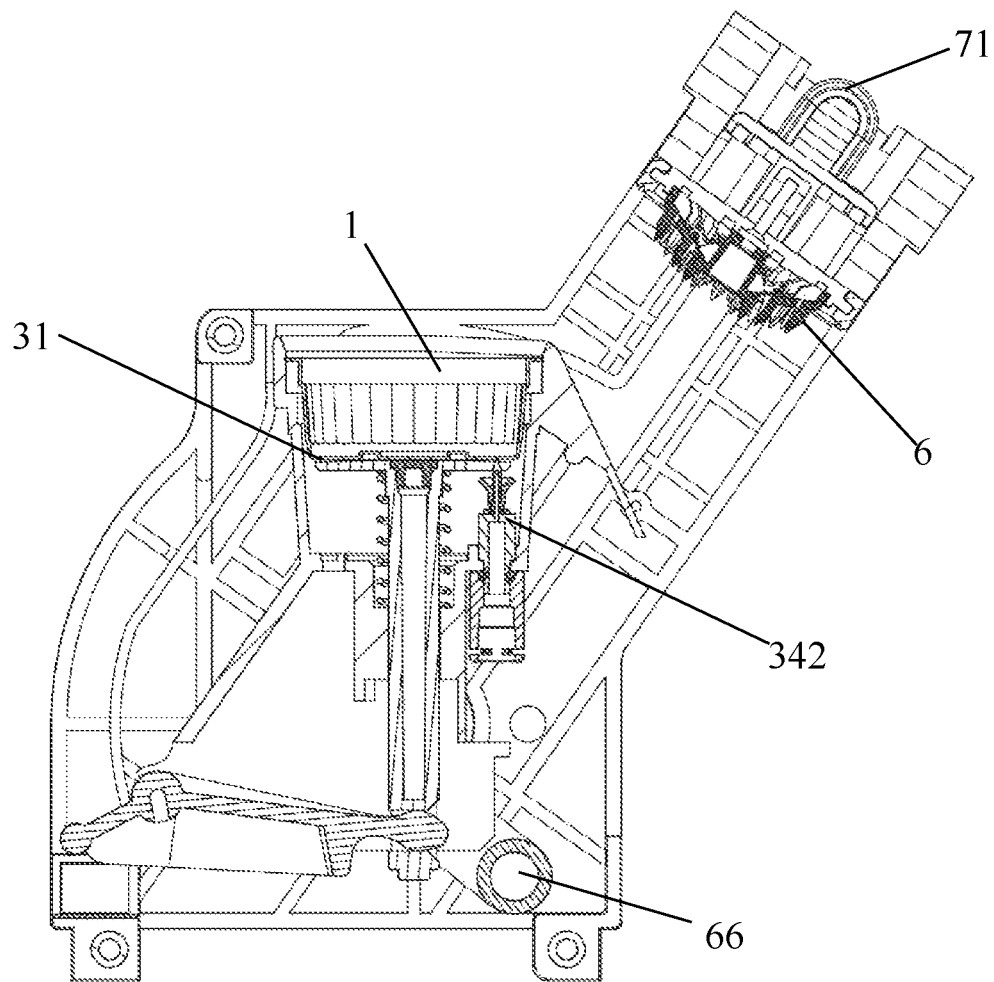
FIG. 22 is a structural illustration of the transmitting apparatus of the beverage producing equipment.

As shown in FIG. 22, the filtering apparatus 6 also includes a funnel 71 buckled on the reverse side of the base plate 61. The funnel 71 is sealed and connected with the base plate 61 to prevent leakage of the tea leaves. The water outlet of the funnel 71 is connected to the water exporting section 35. The funnel 71 gathers and transports the filtered tea water to the water exporting section 35.

In an embodiment, the substance of the filtering apparatus 6 is aluminum or polypropylene plastic. Aluminum or polypropylene plastic is configured to realize low costs, comparatively light weight, good abrasion resistance and a long service life.

Figure 14:
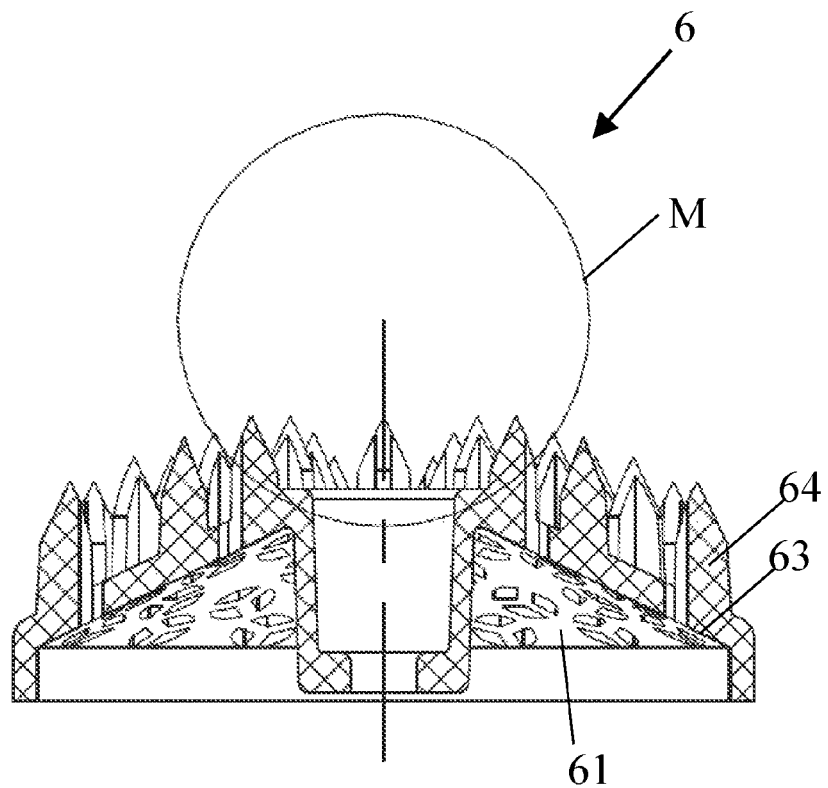
FIG. 14 is a BB sectional view in FIG. 11.
Figure 15:
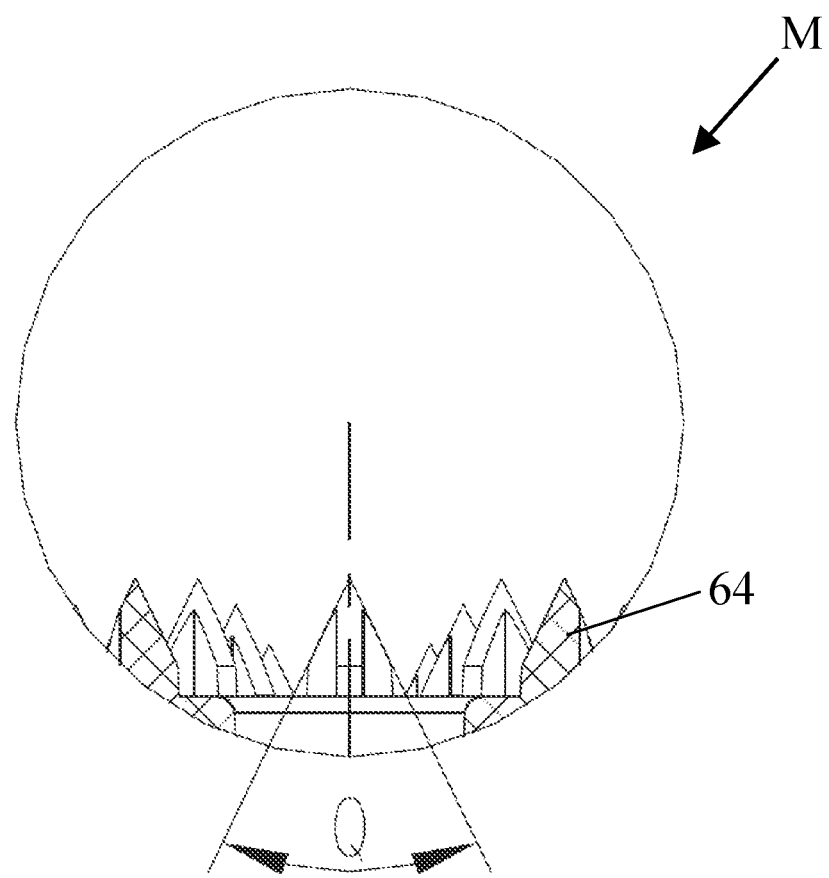
FIG. 15 is a partial enlargement drawing of Part M in embodiment 1.

As shown in FIGS. 14-15, the angle Q in FIG. 15, i.e. the included angle on the top of the piercing point 64, ranges from 30° to 60°. The preferred angle is a 51.2° in certain embodiment.

The controlling part of the beverage producing system controls hot water filled into the beverage substance cartridge 1. After hot water reaches certain amount, hot water will be filled continuously to push the tea water in the beverage substance cartridge 1 from the crack between the tea filtering apparatus 6 and the sealing film of the beverage substance cartridge 1 and into the tea exporting outlet of the apparatus. The tea water flows into the reverse side of the tea filtering apparatus from the front side. The tea water flows into a tea exporting pipe through the gap formed by isolated blocks from the reverse side of the tea filtering apparatus 6. The tea water is exported from the beverage producing system and flows into the tea cup of users.

The water exporting section 35 exports the brewed beverage. The water exporting section 35 includes a supporting platform 24 and a water outlet (not shown in the figure). The water outlet is set right above the supporting platform 24, and the produced beverage flows out from the water outlet. The supporting platform 24 is a hollow structure inside. Some small, thin and long holes are on the surface of the supporting platform. The water overflowing from the cups will flow into the cavity of the supporting platform 24 for clearing.

The controlling section 636 sends the control commands to the water supplying section 33, the brewing apparatus 34 and the water exporting section 35. The controlling section 636 and the inputting and displaying section 38 control displayed content and operational options of the beverage producing equipment 2.

The beverage substance cartridge collecting section 37 collects used beverage substance cartridges 1. The beverage substance cartridge collecting section 37 includes a used cup bucket. The supporting platform 24 is pushed in and pulled out, and the rear part is connected to a square used cup bucket. After the brewing process is finished, the mechanical apparatus in the beverage producing equipment inverts the beverage substance cartridge putting section and discards the used beverage substance cartridges to the used cup bucket for collection. After the supporting platform 24 is pulled out, more than one used beverage substance cartridges can be dumped at a time.

Figure 16:
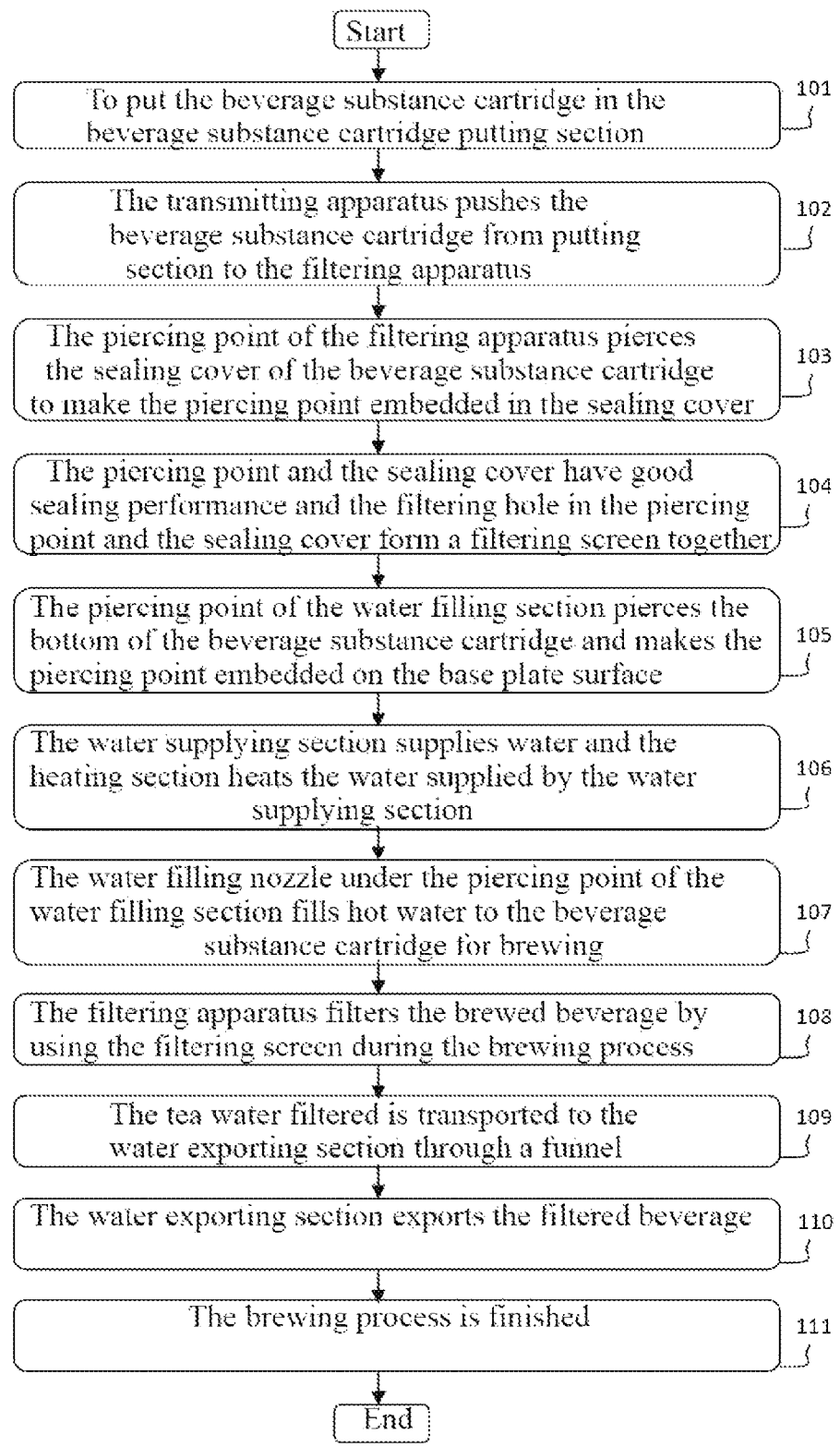
FIG. 16 is a flowchart of a brewing process using a beverage producing equipment.

As shown in FIG. 16, the action flow of the beverage producing system to produce the brew beverage in accordance with an embodiment includes the following steps:

Place the beverage substance cartridge 1 in the beverage substance cartridge putting section 31, and close the cover (Step 101).

Input commands using the keyboard 22 in the inputting and displaying section 38. The controlling section sends commands to the water supplying section 33, the brewing apparatus 34 and the conveying apparatus 66. The conveying apparatus 66 moves the beverage substance cartridge putting section 31 slantways and pushes the beverage substance cartridge putting section 31 towards the filtering apparatus 6 (Step 102).

The piercing point 64 on the filtering apparatus 6 pierces the sealing cover 11 of the beverage substance cartridge 1 to embed the piercing point in the sealing cover (Step 103).

The piercing point 64 and the sealing cover 11 provides a good seal to prevent leakage. The filtering hole 65 in the piercing point 64 and the sealing cover 11 of the beverage substance cartridge 1 form a filtering screen in conjunction to filter the tea leaves (Step 104).

The piercing point of the water filling section 342 in the brewing apparatus 34 pierces the bottom of the beverage substance cartridge 1, thereby embedding the piercing point in the bottom surface of the cartridge body 10. The shortest distance between the piercing point and the rim of the cartridge body 10 is 4 mm (Step 105).

The water supplying section 33 supplies the water, and the heating section 341 in the brewing apparatus 34 heats the water supplied by the water supplying section 33 (Step 106).

The water filling nozzle positioned under the piercing point of the water filling section 342 fills hot water into the beverage substance cartridge 1 for brewing (Step 107).

The filtering apparatus 6 filters the brewed beverage through the filtering screen during the brewing process (Step 108).

The filtered tea water is transported to the water exporting section 35 through the funnel 71 (Step 109).

The water exporting section 35 exports filtered beverage (Step 110).

After the brewing process is finished, the controlling section 636 sends a command to the beverage substance cartridge collecting section 37 to collect the used beverage substance cartridges (Step 111).

The present invention filters tea leaves efficiently without the hassle of manually clearing the used tea leaves. The beverage substance cartridge is used collaboratively with the tea filtering apparatus. The piercing point of the triangular pyramid structure pierces the sealing cover of the beverage substance cartridge to form matrix-shaped filtering holes in the sealing cover. The brewed tea water flows out, and used tea leaves are kept in the extracted cartridge, so the filtering process is simple and convenient.

<Modification 1>

Figure 17:
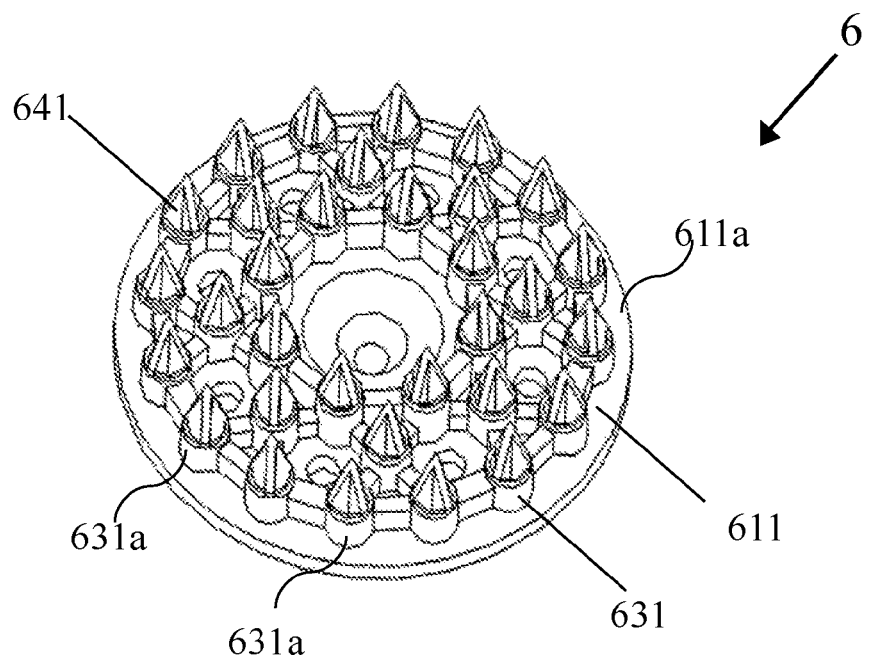
FIG. 17 is a reverse-side structural illustration of the tea filtering apparatus in modification 1 of embodiment 1.
Figure 18:
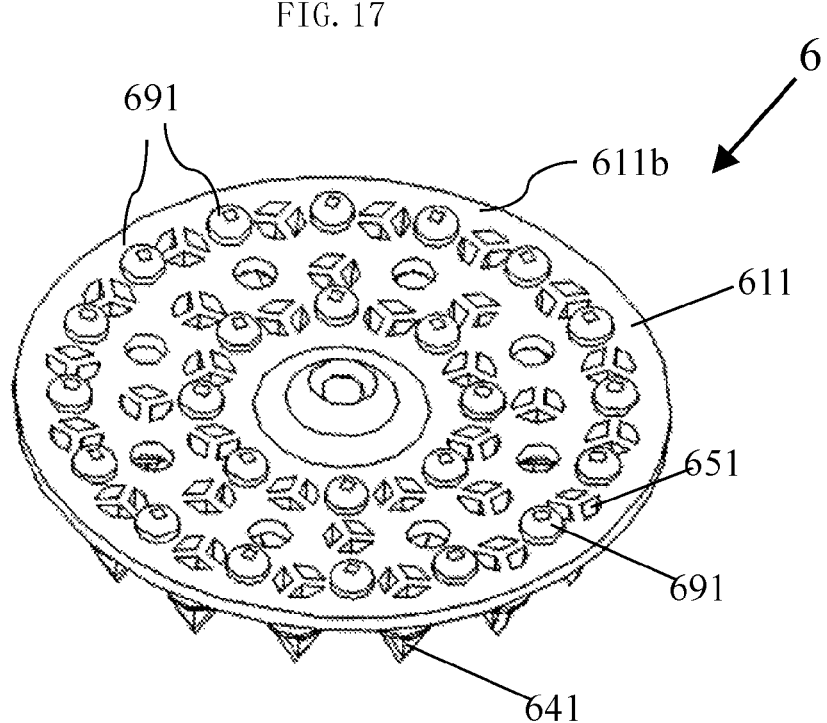
FIG. 18 is a front-side vertical view of the tea filtering apparatus in modification 1 of embodiment 1.

As shown in FIGS. 17-19, a piercing point 641 can be a triangular pyramid structure. A corresponding piercing base 631 is a cylinder with a curved face 631a, and more than one filtering holes run through the piercing base and base plate. In an embodiment, the piercing point 641 is a triangular pyramid and a corresponding piercing base 631 is a cylinder. The three filtering holes 651 are penetrated by the cylinder piercing base and a base plate 611. The base plate 611 includes a front side 611a and a reverse side 611b. Multiple isolating blocks 691 arranged in a circular ring are set on the reverse side of the base plate 611. The filtering apparatus also includes a filtering screen. The filtering screen is used in conjunction with the base plate 611. The isolating blocks isolate the filtering screen and the base plate 611 to provide complete filtering to enhance the beverage filtering effects.

<Modification 2>

As shown in FIGS. 20-21, a piercing point 642 is also a cylinder and the corresponding piercing base 632 is a cylinder. The four filtering holes 652 are penetrated by a piercing point 642, the piercing base 632 and a base plate 612. The external shape of the piercing component is different from modification 1, but provides better filtering effects.

Alternatively, a piercing point 642 is a polygonal pyramid and the corresponding piercing base 632 is a cylinder. The three filtering holes 652 are penetrated by the cylinder piercing base and the base plate 612. The external shape of the piercing component is different from embodiment 1, but provides similar filtering effects as embodiment 1.

Alternatively, the piercing point 64 can be also a polygonal pyramid but the corresponding piercing base 63 is a multi-edged prism. The multiple filtering holes 65 are penetrated by the piercing base and the base plate. The external shape of the piercing component is different from embodiment 1, but provides similar filtering effects as embodiment 1.

The piercing point 64 can be also a polygonal pyramid but the corresponding piercing base 63 is a multi-edged prism or cylinder. Multiple filtering holes 65 are penetrated by the piercing point, the piercing base and the base plate. The external shape of the piercing component is different from embodiment 1, but provides similar filtering effects as embodiment 1.

The shapes of the piercing point 64 and the piercing base 63 are different, but they both ensure that the piercing point 64 pierces the sealing cover 11 of the beverage substance cartridge 1 while providing a tight fit.

The substance in the cartridge body can be any one of or at least two of tea leaf, dried vegetable, dried fruit and Chinese medicinal herb. The beverage producing system of the present invention can produce tea drinks, fruit and vegetable drinks, Chinese medicinal herb health care drinks, etc., and some tea can be brewed more than once.

In summary, the present invention has the following advantages and positive effects:

The present invention provides the beverage substance cartridge, the tea filtering apparatus, the beverage producing equipment, the beverage producing system and the beverage producing method to efficiently filter tea leaves and eliminate the hassle of manually clearing the used tea leaves. The beverage substance cartridge is used in conjunction with the tea filtering apparatus. The piercing point of the triangular pyramid structure pierces the sealing cover of the beverage substance cartridge to form the matrix-shaped filtering holes in the sealing cover. The brewed tea water flows out and the used tea leaf is left in the extracted cartridge, thereby providing a filtering process that is simple and convenient without the need to manually clear the used tea leaves.

It will be appreciated by those skilled in the art that changes can be made to the embodiments described herein without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A filtering apparatus to filter a beverage in a beverage producing apparatus, the filtering apparatus comprising:
   a base plate having a front side, a reverse side, and an outer rim positioned between the front side and the reverse side, an included angle between the base plate and a level surface is 60°;
   a plurality of piercing components connected to the front side of the base plate, each piercing component comprising: a piercing base extending away from the front side of the base plate, and a piercing point integrated with the piercing base having a pointed tip; and
   a plurality of filtering holes extending through the base plate from the front side of the base plate to the reverse side of the base plate, each filtering hole is set between two adjacent edges on the base plate, wherein the filtering apparatus is configured to be positioned within the beverage producing apparatus facing downward and above a beverage substance cartridge such that the filtering apparatus mates with a sealing cover of the beverage substance cartridge by coupling the plurality of piercing components with three filtering holes set at a root of each piercing point with the sealing cover to form a filtering screen to filter the beverage, the sealing cover of the beverage substance cartridge comprises at least two layers of sealing film made of different substances.

2. The filtering apparatus of claim 1, wherein each of said piercing bases is shaped as a cylinder having an upper edge connected to the associated piercing point.

3. The filtering apparatus of claim 1, wherein each of said piercing bases is multi-faced and each face of said each of said piercing bases terminates at one or more bottom edges formed at the base plate and one or more upper edges connected to the associated piercing point.

4. The filtering apparatus of claim 1, wherein one or more of said piercing points has a cone shape.

5. The filtering apparatus of claim 1, wherein the base plate is shaped to complement the shape of the beverage substance cartridge.

6. The filtering apparatus of claim 1, wherein the plurality of piercing components is evenly set on the front side of the base plate.

7. The filtering apparatus of claim 1, wherein one or more of said piercing points forms a pyramid structure.

8. The filtering apparatus of claim 1, wherein one or more of said piercing bases comprises at least two curved faces.

9. The filtering apparatus of claim 1, wherein one or more of said piercing bases has a cross sectional area equal to or larger than a cross-sectional area of the respective piercing point.

10. The filtering apparatus of claim 1, further comprising a fixing hole positioned in the base plate and used to mount the filtering apparatus within the beverage producing apparatus.

11. The filtering apparatus of claim 1, wherein the front side of the base plate forms a convex surface.

12. The filtering apparatus of claim 1, further comprising a funnel connected to the reverse side of the base plate.

13. The filtering apparatus of claim 12, wherein the funnel is sealed with the base plate to prevent leakage of the beverage.

14. The filtering apparatus of claim 1, wherein on the front side of the base plate, each filtering hole has an outer edge and at least two inner edges bounded by a plurality of edges formed at the base plate.

15. The filtering apparatus of claim 14, wherein the outer and inner edges of each filtering hole form a polygonal shape.

16. The filtering apparatus of claim 1, further comprising one or more isolating blocks connected to the reverse side of the base plate.

17. The filtering apparatus of claim 16, wherein said one or more isolating blocks form a circular ring on the reverse side of the base plate.

18. The filtering apparatus of claim 1, wherein the sealing cover of the beverage substance cartridge comprises at least three layers of a sealing film made of different substances, an inner layer is made of a polypropylene material, a middle layer is made of an aluminum foil material and an outer layer is made of polyethylene terephthalate material.

* * * * *